(12) United States Patent
Thompson et al.

(10) Patent No.: US 9,294,503 B2
(45) Date of Patent: Mar. 22, 2016

(54) HEALTH MONITOR BASED DISTRIBUTED DENIAL OF SERVICE ATTACK MITIGATION

(71) Applicants: Micheal Thompson, Morgan Hill, CA (US); Rich Groves, Seattle, WA (US)

(72) Inventors: Micheal Thompson, Morgan Hill, CA (US); Rich Groves, Seattle, WA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

(21) Appl. No.: 14/010,221

(22) Filed: Aug. 26, 2013

(65) Prior Publication Data
US 2015/0058977 A1     Feb. 26, 2015

(51) Int. Cl.
*G06F 11/00* (2006.01)
*H04L 29/06* (2006.01)

(52) U.S. Cl.
CPC ................................ *H04L 63/1458* (2013.01)

(58) Field of Classification Search
CPC ............... H04L 2463/141; H04L 2463/142; H04L 2463/143; H04L 63/1408; H04L 63/1416
USPC ............................ 726/22, 23, 25, 13; 709/235
See application file for complete search history.

(56) References Cited

U.S. PATENT DOCUMENTS

| | | |
|---|---|---|
| 4,001,819 A | 1/1977 | Wise |
| 4,780,905 A | 10/1988 | Cruts et al. |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,584,023 A | 12/1996 | Hsu |
| 5,684,875 A | 11/1997 | Ellenberger |
| 5,757,908 A | 5/1998 | Cooper et al. |
| 5,940,002 A | 8/1999 | Finn et al. |
| 5,960,177 A | 9/1999 | Tanno |
| 6,185,681 B1 | 2/2001 | Zizzi |
| 6,205,115 B1 | 3/2001 | Ikebe et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |

(Continued)

FOREIGN PATENT DOCUMENTS

| | | |
|---|---|---|
| TW | 477140 | 2/2002 |
| TW | 574655 | 2/2004 |

(Continued)

OTHER PUBLICATIONS

Oracle Corporation. Oracle Intelligent Agent User's Guide, Release 9.2.0, Part No. A96676-01. Mar. 2002.

(Continued)

*Primary Examiner* — Samson Lemma
(74) *Attorney, Agent, or Firm* — Carr & Ferrell LLP

(57) ABSTRACT

Provided are methods and systems for mitigating a DDoS event. The method may comprise receiving an indication of a collapse of a collapsible virtual data circuit associated with network data traffic. In response to the received indication of the collapse, the collapse may be attributed to the DDoS event. Furthermore, the method may comprise redirecting the network data traffic to one or more DDoS mitigation services. The method may further comprise mitigating the DDoS event by the one or more DDoS mitigation services.

14 Claims, 4 Drawing Sheets

(56) References Cited

U.S. PATENT DOCUMENTS

| | | |
|---|---|---|
| 6,594,780 B1 | 7/2003 | Shen et al. |
| 6,715,081 B1 | 3/2004 | Attwood et al. |
| 6,732,279 B2 | 5/2004 | Hoffman |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,092,357 B1 | 8/2006 | Ye |
| 7,194,766 B2 | 3/2007 | Noehring et al. |
| 7,200,760 B2 | 4/2007 | Riebe et al. |
| 7,221,757 B2 | 5/2007 | Alao |
| 7,392,241 B2 | 6/2008 | Lin et al. |
| 7,409,712 B1 * | 8/2008 | Brooks et al. ............... 726/22 |
| 7,543,052 B1 | 6/2009 | Cesa Klein |
| 7,577,833 B2 | 8/2009 | Lai |
| 7,596,695 B2 | 9/2009 | Liao et al. |
| 7,665,138 B2 | 2/2010 | Song et al. |
| 7,925,766 B2 | 4/2011 | Jayawardena et al. |
| 7,953,855 B2 * | 5/2011 | Jayawardena et al. ........ 709/225 |
| 8,089,871 B2 * | 1/2012 | Iloglu et al. ................. 370/230 |
| 8,239,670 B1 | 8/2012 | Kaufman et al. |
| 8,276,203 B2 | 9/2012 | Nakhre et al. |
| 8,301,802 B2 | 10/2012 | Wei et al. |
| 8,719,446 B2 * | 5/2014 | Spatscheck et al. .......... 709/238 |
| 2001/0042204 A1 | 11/2001 | Blaker et al. |
| 2002/0087708 A1 | 7/2002 | Low et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059951 A1 | 3/2004 | Pinkas et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0148520 A1 * | 7/2004 | Talpade et al. ................ 713/201 |
| 2004/0172538 A1 | 9/2004 | Satoh et al. |
| 2005/0021999 A1 | 1/2005 | Touitou et al. |
| 2005/0041584 A1 | 2/2005 | Lau et al. |
| 2005/0044068 A1 | 2/2005 | Lin et al. |
| 2005/0125684 A1 | 6/2005 | Schmidt |
| 2005/0180416 A1 * | 8/2005 | Jayawardena et al. ........ 370/389 |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0185014 A1 * | 8/2006 | Spatscheck et al. ............ 726/23 |
| 2006/0230444 A1 * | 10/2006 | Iloglu et al. .................... 726/14 |
| 2006/0265585 A1 | 11/2006 | Lai |
| 2007/0280114 A1 * | 12/2007 | Chao et al. ................. 370/235.1 |
| 2008/0183885 A1 | 7/2008 | Durrey et al. |
| 2008/0256623 A1 | 10/2008 | Worley et al. |
| 2009/0168995 A1 | 7/2009 | Banga et al. |
| 2010/0138921 A1 * | 6/2010 | Na et al. ......................... 726/22 |
| 2011/0082947 A1 | 4/2011 | Szeto et al. |
| 2011/0131646 A1 | 6/2011 | Park et al. |
| 2011/0249572 A1 | 10/2011 | Singhal et al. |
| 2012/0036272 A1 | 2/2012 | El Zur |
| 2012/0042060 A1 | 2/2012 | Jackowski et al. |
| 2012/0110472 A1 | 5/2012 | Amrhein et al. |
| 2012/0163186 A1 | 6/2012 | Wei et al. |
| 2012/0174196 A1 | 7/2012 | Bhogavilli et al. |
| 2013/0019025 A1 | 1/2013 | Chaturvedi et al. |
| 2013/0212265 A1 | 8/2013 | Rubio Vidales et al. |
| 2013/0263256 A1 | 10/2013 | Dickinson et al. |
| 2014/0269308 A1 | 9/2014 | Oshiba |
| 2014/0280832 A1 | 9/2014 | Oshiba |
| 2014/0325588 A1 | 10/2014 | Jalan et al. |

FOREIGN PATENT DOCUMENTS

| | | |
|---|---|---|
| TW | NI197237 | 2/2004 |
| TW | I225999 | 1/2005 |
| TW | I241818 | 10/2005 |
| TW | I252976 | 4/2006 |
| WO | 1998042108 | 9/1998 |
| WO | WO2006039529 | 4/2006 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

SOL11243. iRules containing the RULE_INIT iRule event do not re-initialize when a syntax error is corrected. f5. support.com. May 24, 2010.

Mutz, "Linux Encryption How To," available at http://encryptionhowto.sourceforge.net/Encryption-HOWTO-1.html, Oct. 4, 2000.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Dainotti, Albert et al. TIE: A Community-Oriented Traffic Classification Platform. May 11th, 2009. Springer-Verlag, Traffic Monitoring and Analysis: Proceedings First International Workshop, TMA 2009. Pages 64-74. Retrieved from: Inspec. Accession No. 11061142.

* cited by examiner

HEALTH MONITOR BASED DISTRIBUTED DENIAL OF SERVICE ATTACK MITIGATION

TECHNICAL FIELD

This disclosure relates generally to computer and network security and, more particularly, to mitigation of distributed denial of service (DDoS) attacks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A Denial of Service (DoS) attack is typically an attempt to make a network machine or network resource unavailable to intended users. Generally speaking, a DoS attack is an attempt to overwhelm the capacity of a server in order to interrupt or suspend functioning of network resources associated with the server. Traditional methods for detecting DoS attacks are typically based on monitoring incoming traffic and detecting the DoS attack based on an observation of a large increase in traffic, especially when a large portion of the traffic originates from a single IP address. In this case, mitigating the DoS attack includes filtering out the traffic associated with any IP addresses identified as malicious.

However, the aforementioned technique for mitigating a DOS attack may not be very effective in mitigating a Distributed Denial of Service (DDoS) attack. In case of a DDoS attack, incoming traffic may originate from a large number of attacking machines, each having a distinct IP address.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for mitigating a DDoS attack. Specifically, a method for mitigating a DDoS attack may comprise receiving an indication of a collapse of a collapsible virtual data circuit associated with network data traffic. In response to the received indication of the collapse, the collapse may be attributed to the DDoS event. Furthermore, the method may comprise redirecting the network data traffic to one or more DDoS mitigation services. The method may further comprise mitigating the DDoS event by the one or more DDoS mitigation services.

According to another approach of the present disclosure, there is provided a system for mitigating a DDoS event. The system may comprise a processor. The processor of the system may be configurable to receive an indication of a collapse of a collapsible virtual data circuit associated with network data traffic. In response to the indication, the processor may attribute the collapse to the DDoS event. Furthermore, the processor may be configurable to redirect the network data traffic to one or more DDoS mitigation services. The processor may further mitigate the DDoS event by the one or more DDoS mitigation services.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
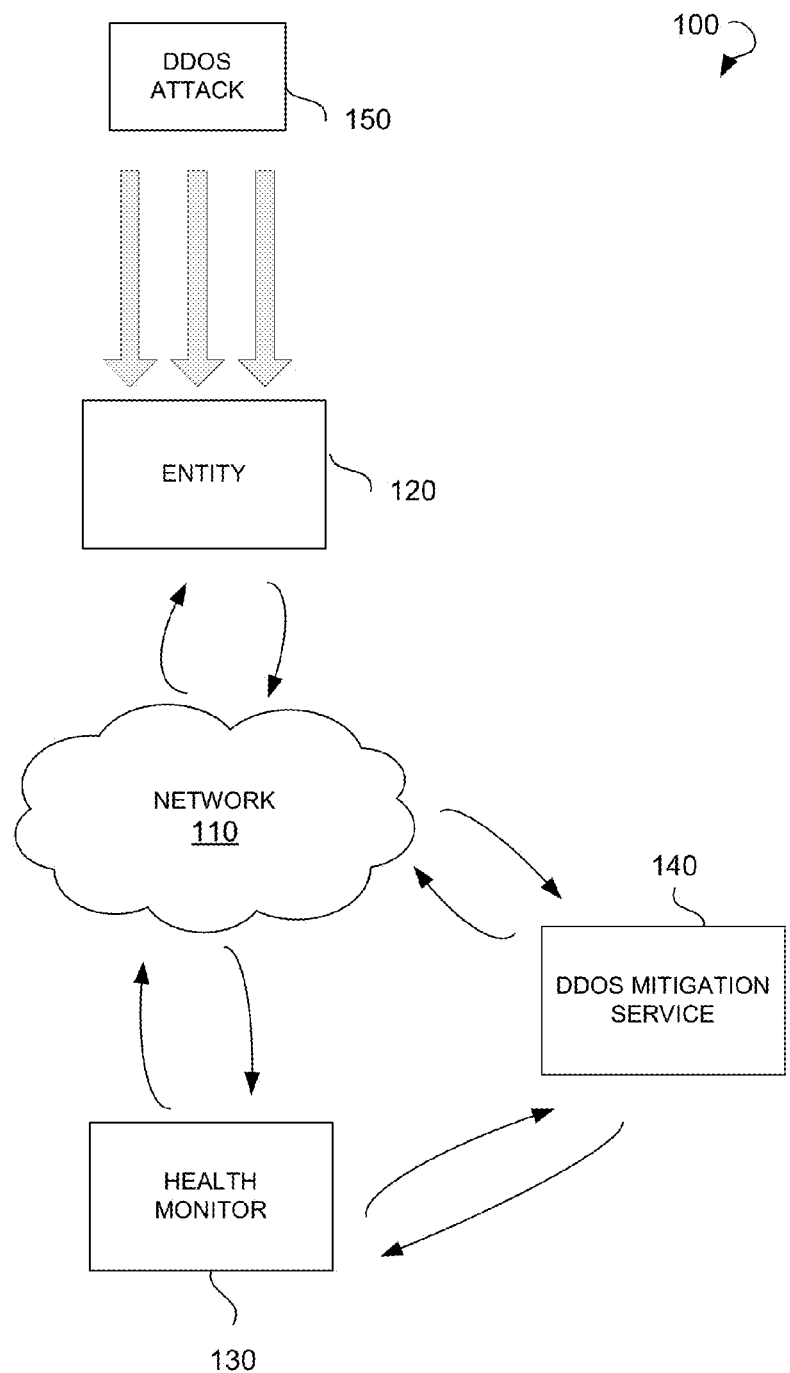
FIG. 1 shows an environment within which a method and a system for mitigating a DDoS event can be implemented, according to an example embodiment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure refer to mitigating a DDoS event. As used herein, "a DDoS event" may comprise a DDoS attack directed at a network machine or a network resource. A system for mitigating a DDoS event may evaluate health or state of a remote network machine or resource to identify a DDoS event affecting the network machine or resource and to automatically trigger a DDoS mitigation service. The system for mitigating the DDoS event may comprise a health monitor configured as a collapsible virtual data circuit. The collapsible virtual data circuit may refer to a virtual circuit configured to stop flow of data traffic as an indication of a DDoS event. During normal mode of operation, network traffic may be directed through the collapsible virtual data circuit. When the collapsible virtual data circuit collapses an additional circuit is activated and the traffic is routed through the additional circuit.

The health monitoring may involve software, hardware, signaling, and various database queries configured to determine the state of a network or resource. In a normal operation mode of the network or resource, the health monitor may utilize various health checks of the network or resource to determine the state of the system. While the health monitor is operational and the state of the network or resource can be successfully verified, there is no need to utilize the DDoS mitigation service. If the state of the network or resource cannot be verified, or in other words, the health monitor fails and the collapsible virtual data circuit collapses, another virtual data circuit can be established. When another virtual circuit data is established, the incoming traffic of the network or resource is redirected through the DDoS mitigation service, where the DDoS data packets are filtered by the DDoS mitigation service and redirected to the destination network or resource.

Thus, failure of the health monitor may be attributed to the presence of a DDoS event and cause rerouting of the traffic to the DDoS mitigation service. Once it is determined that the network or resource is no longer experiencing a DDoS event, the ability of the health monitor to check the state of the network or resource is restored by redirecting the network traffic from the DDoS mitigation service back to the network or resource.

Referring now to the drawings, FIG. 1 illustrates an environment 100 within which a method and a system for mitigating a DDoS attack can be implemented. The environment 100 may include a network 110, an entity 120, a health monitor 130, and a DDoS mitigation service 140. The entity 120 may include a network machine or a network resource that is in need of protection from a DDoS event. In case a DDoS attack 150 is targeted to the entity 120, a DDoS event may be diagnosed in the entity 120.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34b is analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication.

As shown, the health monitor 130 may be connected to the network 110. The health monitor 130 may be expressed by means of software, hardware, signaling, database query or any means of notification that would occur over an Ethernet, Internet protocol (IP), or a software defined network (SDN) where the state of the entity can be monitored for DDoS entanglement. The signaling may include transmitting notifications and messages over the Ethernet, IP, or the SDN. The database query may be performed, e.g., by using a combination of a plurality of predefined search criteria options. Thus, the health monitor 130 may be configured to monitor and determine a current state of the entity 120. The health monitor 130 may ensure notification of a DDoS event during normal operation of the entity 120.

The environment 100 may further comprise an application delivery controller (ADC) (not shown) and an external DDoS service (not shown), both connected to the network 110. Typically, the ADC includes a network appliance that manages the load balancing and delivery of service sessions from client host computers to servers based on incoming service requests. The external DDoS service may be a service provided by an appliance disposed outside a network associated with the entity 120. The external DDoS service may provide assistance associated with DDoS entanglement.

The health monitor 130 may be connected to an ADC, a DDoS mitigation service, an external DDoS service, or any generic service. The purpose of the connection is to confirm that the state of the service provided by the entity is not affected by a DDoS event.

Figure 2:
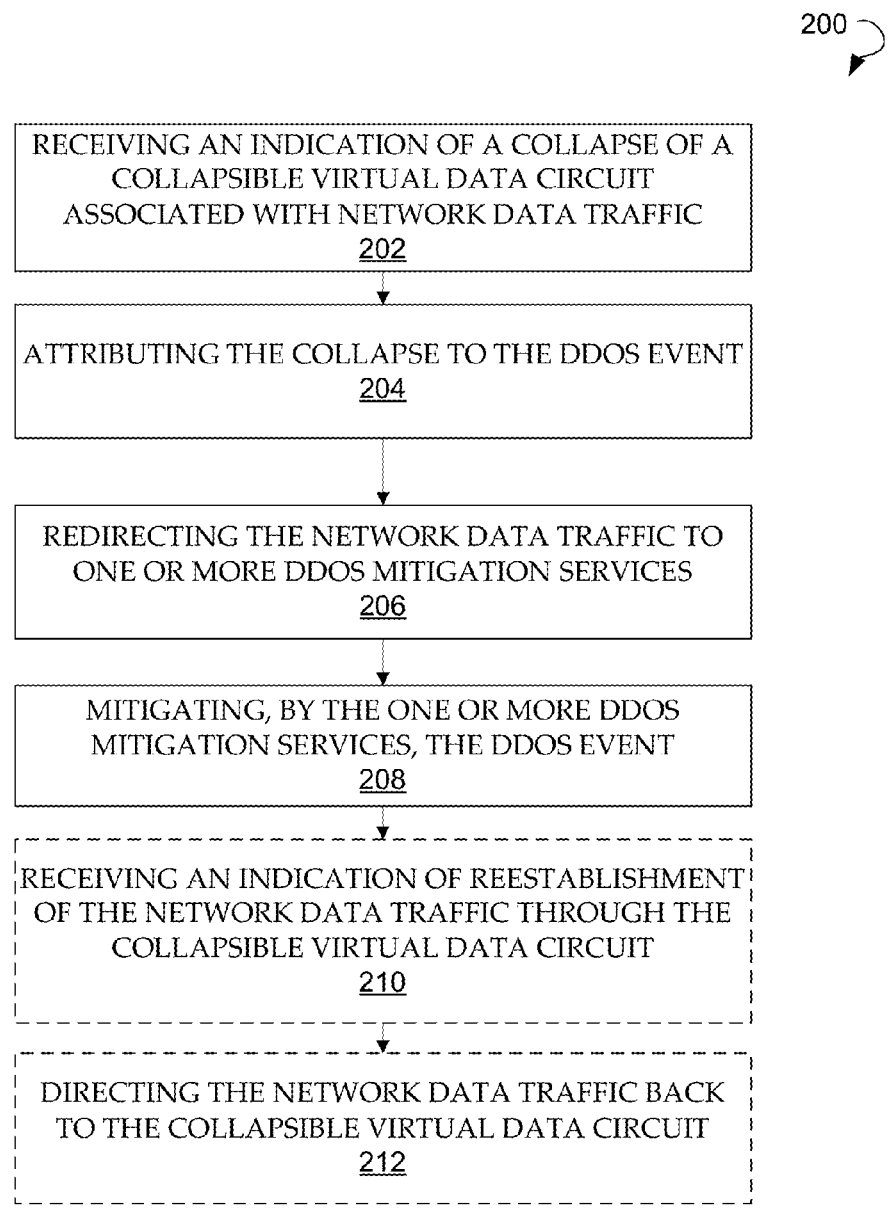
FIG. 2 is a process flow diagram showing a method for mitigating a DDoS event, according to an example embodiment.

FIG. 2 is a process flow diagram showing a method 200 for mitigating a DDoS event, according to an example embodiment. The method 200 may be performed by processing logic that may comprise hardware (e.g., decision making logic, dedicated logic, programmable logic, and microcode), software (such as software run on a general-purpose computer system or a dedicated machine), or a combination of both.

The method 200 may commence with receiving an indication of a collapse of a collapsible virtual data circuit associated with network data traffic at operation 202. In a sample embodiment, the virtual data circuit may be established by one or more of the following: software, hardware, signaling, and the like. The indication of the collapse may be established upon a notification from a health monitor associated with the collapsible virtual data circuit. The notification may indicate an interruption of the network data traffic through the collapsible virtual data circuit. In response to the received indication, the collapse may be attributed to the DDoS event at operation 204. In response, at operation 206, the network data traffic may be redirected to one or more DDoS mitigation services.

At operation 208, the DDoS event may be mitigated by the one or more DDoS mitigation services. The DDoS mitigation service may be configurable to analyze the network data traffic to detect DDoS data packages, i.e. data packages sent by an originator of the DDoS event. Furthermore, the DDoS mitigation service may be configurable to filter the DDoS data packages to provide a filtered network data traffic.

At optional operation 210, the method may further comprise receiving an indication of reestablishment of the network data traffic through the collapsible virtual data circuit. This indication may be received in response to a request sent to a health monitor associated with the collapsible virtual data circuit. The notification may be indicative of the presence of the network data traffic in the collapsible virtual data circuit. The received notification concerning the network data traffic through the collapsible virtual data circuit may be attributed to a successful mitigation of the DDoS event. In response to the received indication, the network data traffic may be directed back to the collapsible virtual data circuit at optional operation 212. The network data traffic directed back to the collapsible virtual data circuit may include the filtered network data traffic filtered by the DDoS mitigation service.

In an example embodiment, the indication of the collapse of the collapsible virtual data circuit and the indication of reestablishment of the network data traffic through the collapsible virtual data circuit may be performed by at least one of the following: Ethernet, IP, and SDN. Optionally, the method 200 may comprise changing a Domain Name System (DNS) name upon receiving the indication of the collapse of the collapsible virtual data circuit.

Figure 3:
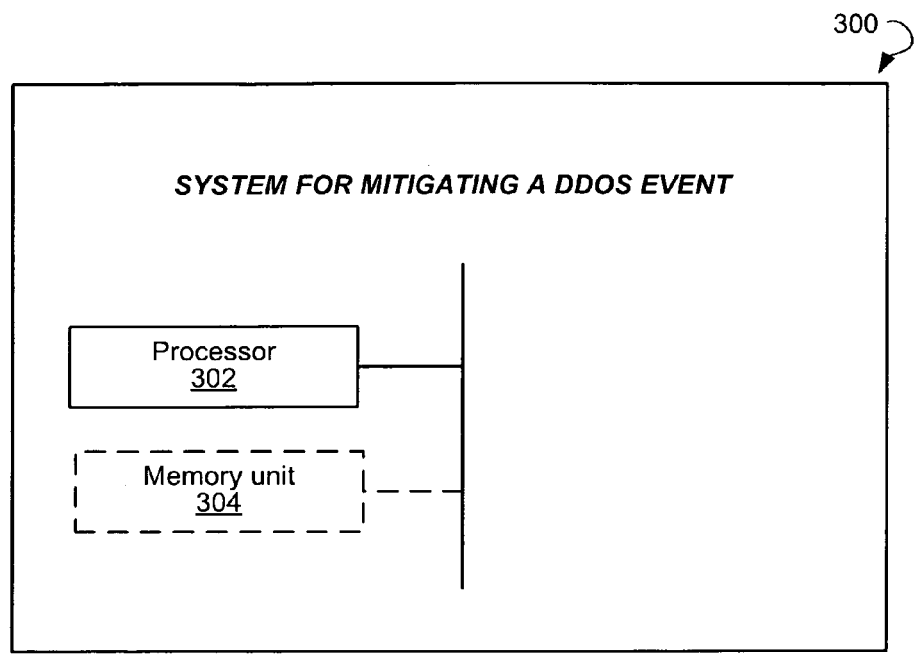
FIG. 3 is a block diagram showing various modules of a system for mitigating a DDoS event, according to an example embodiment.

FIG. 3 shows a block diagram showing various modules of an exemplary system 300 for mitigating a DDoS event. Specifically, the system 300 may include a processor 302. The processor 302 may be configurable to receive an indication of a collapse of a collapsible virtual data circuit associated with network data traffic. The virtual data circuit may be established by one or more of the following: software, signaling, and the like. To receive the indication of the collapse, the processor 302 may send a request to a health monitor associated with the collapsible virtual data circuit. In response to the request, the processor 302 may receive, from the health monitor, a notification about interruption of the network data traffic through the collapsible virtual data circuit.

Furthermore, the processor 302 may be configurable to attribute, in response to the received indication, the collapse to the DDoS event. When the DDoS event is detected, the processor 302 may be further configurable to redirect the network data traffic to one or more DDoS mitigation services. Furthermore, the processor 302 may be configurable to mitigate the DDoS event by the one or more DDoS mitigation services.

In an example embodiment, the DDoS mitigation service may analyze the network data traffic to detect DDoS data packages. After the analysis, the DDoS mitigation service may filter the DDoS data packages to provide filtered network data traffic.

In an example embodiment, the processor 302 may be further configurable to receive an indication of reestablishment of the network data traffic through the collapsible virtual data circuit. To obtain the indication, the processor 302 may send a request to a health monitor associated with the collapsible virtual data circuit. In response to the request, the processor 302 may receive, from the health monitor, a notification concerning the presence of the network data traffic in the collapsible virtual data circuit. The processor 302 may attribute the notification concerning the presence of the network data traffic in the collapsible virtual data circuit to successful mitigation of the DDoS event. After receiving of the indication of the reestablishment, the processor 302 may direct the network data traffic back to the collapsible virtual data circuit. The network data traffic directed back to the collapsible virtual data circuit may include the filtered network data.

In an example embodiment, the processor 302 may be configurable to receive the indication of the collapse of the collapsible virtual data circuit and the indication of the reestablishment of the network data traffic through the collapsible virtual data circuit via at least one of the following: Ethernet, IP, and SDN.

In an example embodiment, the processor 302 may be further configurable to change a Domain Name System (DNS) name upon receiving the indication of the collapse of the collapsible virtual data circuit.

In an example embodiment, the system 300 may optionally comprise a memory 304 that may store instructions and code implementable by the processor 302.

Figure 4:
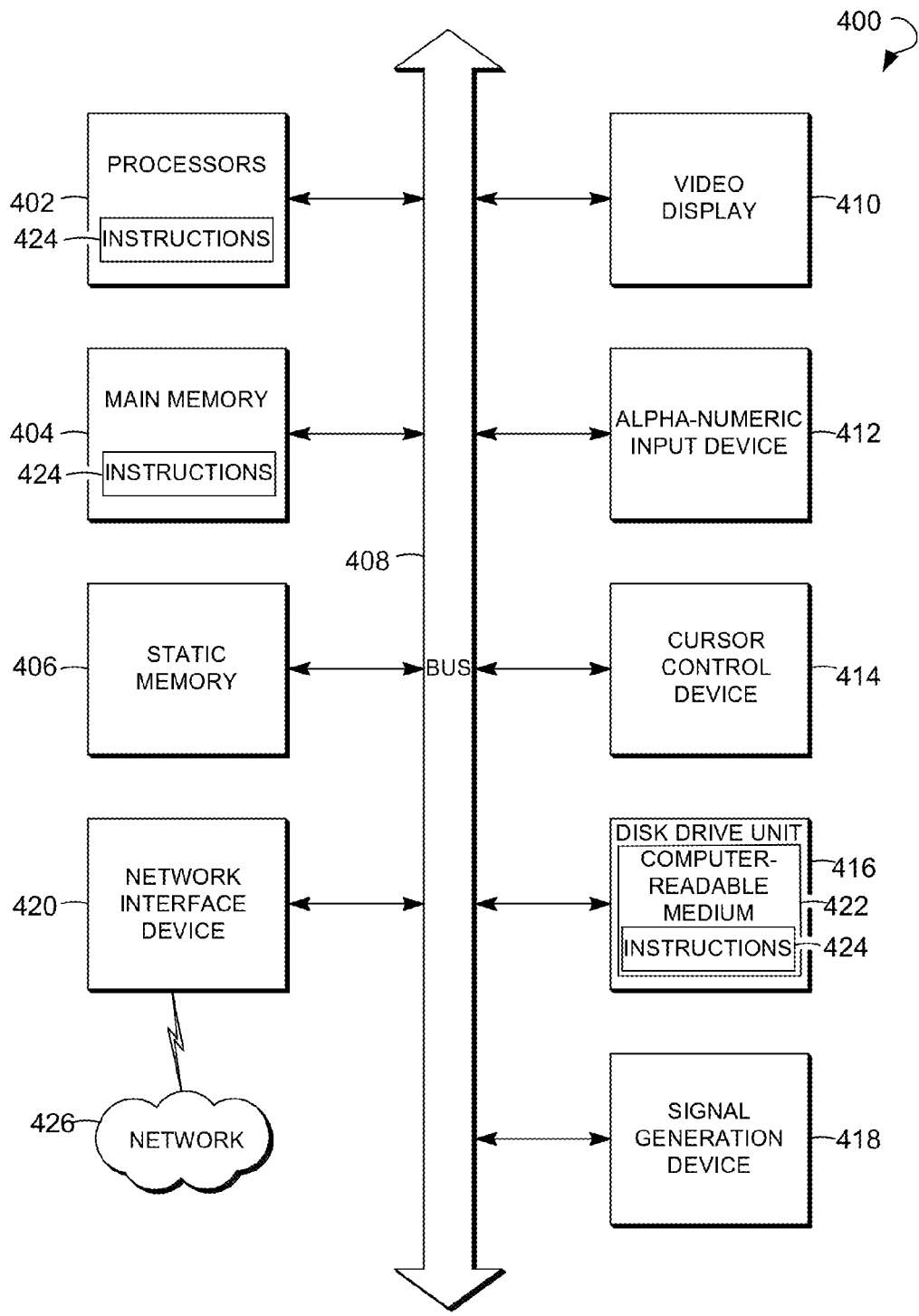
FIG. 4 shows a diagrammatic representation of a computing device for a machine in the example electronic form of a computer system, within which a set of instructions for causing the machine to perform any one or more of the methodologies discussed herein can be executed.

FIG. 4 shows a diagrammatic representation of a machine in the example electronic form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 may also include an alphanumeric input device 412 (e.g., a keyboard), a cursor control device 414 (e.g., a mouse), a disk drive unit 416, a signal generation device 418 (e.g., a speaker), and a network interface device 420.

The disk drive unit 416 includes a non-transitory computer-readable medium 422, on which is stored one or more sets of instructions and data structures (e.g., instructions 424) embodying or utilized by any one or more of the methodologies or functions described herein. The instructions 424 may also reside, completely or at least partially, within the main memory 404 and/or within the processors 402 during execution thereof by the computer system 400. The main memory 404 and the processors 402 may also constitute machine-readable media.

The instructions 424 may further be transmitted or received over a network 426 via the network interface device 420 utilizing any one of a number of well-known transfer protocols (e.g., Hyper Text Transfer Protocol (HTTP)).

While the computer-readable medium 422 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for mitigating a DDoS event are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for mitigating a distributed denial of service (DDoS) event, the method comprising:
   sending, by a processor, a request to a health monitor regarding a state of a remote network resource, the health monitor associated with a collapsible virtual data circuit that normally conveys network data traffic and collapses in response to a DDoS event by stopping flow of the network data traffic;
   in response to the request, receiving a notification at the processor from the health monitor of an interruption of the network data traffic due to the collapse of the collapsible virtual data circuit;
   in response to the notification, attributing the interruption of the network data traffic due to the collapse of the collapsible virtual data circuit to the DDoS event;
   changing a Domain Name System (DNS) name upon receiving the notification of the collapse of the collapsible virtual data circuit;
   redirecting the network data traffic to one or more DDoS mitigation services;
   sending a request to the health monitor associated with the collapsible virtual data circuit regarding the status of the network data traffic flow; and
   in response to the request regarding the status of the network data traffic flow, receiving a notification from the health monitor indicating a presence of the network data traffic in the collapsible virtual data circuit, the notification of the presence of the network data traffic in the collapsible virtual data circuit being attributed to a successful mitigation of the DDoS event.

2. The method of claim 1, wherein the health monitor is implemented by one or more of the following: software, hardware, signaling, and database query.

3. The method of claim 1, wherein the one or more DDoS mitigation services analyzes the network data traffic to detect DDoS data packages, and filters the DDoS data packages to provide filtered network data traffic.

4. The method of claim 1, further comprising:
   receiving an indication from the health monitor of reestablishment of the network data traffic through the collapsible virtual data circuit; and
   directing the network data traffic back to the collapsible virtual data circuit.

5. The method of claim 4, wherein the network data traffic includes filtered network data traffic.

6. The method of claim 1, wherein the receiving of the notification of the collapse of the collapsible virtual data circuit is performed via at least one of the following: Ethernet, Internet Protocol (IP), and software defined network (SDN).

7. A system for mitigating a DDoS event, the system comprising a processor that:
   sends a request to a health monitor regarding a state of a remote network resource, the health monitor associated with a collapsible virtual data circuit that normally conveys network data traffic and collapses in response to a DDoS event by stopping flow of the network data traffic;
   in response to the request, receives a notification at the processor from the health monitor of an interruption of the network data traffic due to the collapse of the collapsible virtual data circuit;
   in response to the notification, attributes the interruption of the network data traffic due to the collapse of the collapsible virtual data circuit to the DDoS event;
   changes a Domain Name System (DNS) name upon receiving the notification of the collapse of the collapsible virtual data circuit;
   redirects the network data traffic to one or more DDoS mitigation services;
   sends a request to the health monitor associated with the collapsible virtual data circuit regarding the status of the network data traffic flow; and
   in response to the request regarding the status of the network data traffic flow, receives a notification from the health monitor indicating a presence of the network data traffic in the collapsible virtual data circuit, the notification of the presence of the network data traffic in the collapsible virtual data circuit being attributed to a successful mitigation of the DDoS event.

8. The system of claim 7, wherein the health monitor is implemented by one or more of the following: software, hardware, signaling, and database query.

9. The system of claim 7, wherein the one or more DDoS mitigation service:
   analyzes the network data traffic to detect DDoS data packages; and
   filters the DDoS data packages to provide filtered network data traffic.

10. The system of claim 7, wherein the processor further:
receives an indication from the health monitor of reestablishment of the network data traffic through the collapsible virtual data circuit; and
directs the network data traffic back to the collapsible virtual data circuit.

11. The system of claim 10, wherein the network data traffic includes filtered network data traffic.

12. The system of claim 7, wherein the receiving of the notification of the collapse of the collapsible virtual data circuit is performed via at least one of Ethernet, Internet Protocol (IP), and software defined network (SDN).

13. A non-transitory machine-readable medium comprising instructions which, when executed by one or more processors, perform the following operations:
send, by a processor, a request to a health monitor associated with a collapsible virtual data circuit regarding a state of a remote network resource, the collapsible virtual data circuit normally conveying network data traffic and collapsing in response to a DDoS event by stopping flow of the network data traffic;
in response to the request, receive a notification at the processor from the health monitor of an interruption of the network data traffic due to the collapse of the collapsible virtual data circuit;
in response to the notification, attribute the interruption of the network data traffic due to the collapse of the collapsible virtual data circuit to the DDoS event;
change a Domain Name System (DNS) name upon receiving the notification of the collapse of the collapsible virtual data circuit;
redirect the network data traffic to one or more DDoS mitigation services;
send a request to the health monitor associated with the collapsible virtual data circuit regarding the status of the network data traffic flow; and
in response to the request regarding the status of the network data traffic flow, receive a notification from the health monitor indicating a presence of the network data traffic in the collapsible virtual data circuit, the notification of the presence of the network data traffic in the collapsible virtual data circuit being attributed to a successful mitigation of the DDoS event.

14. The method of claim 1 further comprising mitigating, by the one or more DDoS mitigation services, the DDoS event.

\* \* \* \* \*